(12) United States Patent
Tsuchizawa et al.

(10) Patent No.: US 11,415,747 B2
(45) Date of Patent: Aug. 16, 2022

(54) OPTICAL INTEGRATED DEVICE AND PRODUCTION METHOD THEREFOR

(71) Applicant: Nippon Telegraph and Telephone Corporation, Tokyo (JP)

(72) Inventors: Tai Tsuchizawa, Tokyo (JP); Takuma Aihara, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/055,555

(22) PCT Filed: May 9, 2019

(86) PCT No.: PCT/JP2019/018524
§ 371 (c)(1),
(2) Date: Nov. 13, 2020

(87) PCT Pub. No.: WO2019/225329
PCT Pub. Date: Nov. 28, 2019

(65) Prior Publication Data
US 2021/0181412 A1    Jun. 17, 2021

(30) Foreign Application Priority Data
May 21, 2018    (JP) .............................. JP2018-096888

(51) Int. Cl.
G02B 6/122    (2006.01)
G02B 6/132    (2006.01)
G02B 6/12     (2006.01)

(52) U.S. Cl.
CPC ............ *G02B 6/122* (2013.01); *G02B 6/132* (2013.01); *G02B 2006/12061* (2013.01)

(58) Field of Classification Search
None
See application file for complete search history.

(56) References Cited

U.S. PATENT DOCUMENTS 3,791,714 A * 2/1974 Maurer ................. C03C 3/00
                                                    385/142
2003/0012538 A1    1/2003 Johnson et al.
(Continued)

FOREIGN PATENT DOCUMENTS

JP    H11231152 A    8/1999
JP    2003525195 A    8/2003
(Continued)

OTHER PUBLICATIONS

W. Jin et al. Deuterated silicon dioxide for heterogeneous integration of ultra-low-loss waveguides. Optics Letters, 45:12:3340-3343, Jun. 15, 2020. (Year: 2020).*
(Continued)

*Primary Examiner* — Michael Stahl
(74) *Attorney, Agent, or Firm* — Slater Matsil, LLP

(57) ABSTRACT

Included are an optical waveguide including a first cladding layer formed on a substrate; a core formed on the first cladding layer; and a second cladding layer formed on the first cladding layer so as to cover the core. At least one of the first cladding layer and the second cladding layer is composed of a cladding material of silicon oxide containing deuterium atoms. The number of hydrogen atoms contained in the cladding material is smaller than the number of the deuterium atoms contained in the cladding material.

15 Claims, 3 Drawing Sheets

(56) References Cited

U.S. PATENT DOCUMENTS

| | | | |
|---|---|---|---|
| 2004/0062504 A1 | 4/2004 | Bellman et al. | |
| 2007/0230886 A1 | 10/2007 | Chen et al. | |
| 2008/0048280 A1* | 2/2008 | Tsukamoto | H01L 27/14625 257/432 |
| 2008/0131794 A1* | 6/2008 | Bookbinder | G03F 7/70958 430/5 |

FOREIGN PATENT DOCUMENTS

| | | | |
|---|---|---|---|
| JP | 2004085937 A | | 3/2004 |
| JP | 2005300212 A | | 10/2005 |
| JP | 2005-338502 A | * | 12/2005 |
| JP | 2017191158 A | | 10/2017 |
| WO | WO 01/64594 A1 | * | 9/2001 |

OTHER PUBLICATIONS

English translation of written opinion for PCT/JP2019/018524, dated Jul. 2, 2019. (Year: 2019).*

* cited by examiner

OPTICAL INTEGRATED DEVICE AND PRODUCTION METHOD THEREFOR

This patent application is a national phase filing under section 371 of PCT/JP2019/018524, filed May 9, 2019, which claims the priority of Japanese patent application 2018-096888, filed May 21, 2018, each of which is incorporated herein by reference in its entirety.

TECHNICAL FIELD

The present invention relates to an optical integrated device in which an optical waveguide is integrated together with an optical element and the like, and a manufacturing method thereof.

BACKGROUND

With the rapid spread of cloud and mobile environments, the amount of information distribution has been increasing, and now, there is a strong demand for large capacity, high speed, and low power consumption of optical networks. In order to achieve these, higher performance, lower power consumption, and lower cost of optical devices that support wavelength-division multiplexing (WDM) communication, which is a feature of optical communication, are important. With this background, in recent years, research and development have been actively made on the smaller size and higher performance of optical devices such as optical waveguide devices, light emitting devices, and light receiving devices, and improved device functionality and cost reduction by integration of the optical devices on the same substrate.

Regarding such optical integrated devices, expectations are rising on research and development of optical waveguides using Si, SiN, and SiON as a core and $SiO_2$ as a clad which contribute to size reduction and cost reduction and widen the selectivity of the refractive index (see Patent Literature 1). Optical waveguides having Si, SiN, and SiON as a core have been known for a long time as optical waveguide systems exhibiting a higher refractive index difference between the core and the clad than quartz systems, and have also been studied for communication network applications.

However, in forming an optical waveguide with a small propagation loss using these high-refractive-index materials as a core, the problem arises that a technique for forming a film of a high-quality core material and a high accuracy processing technique are required. Such difficulty in fabrication has been an impediment to implementation of practical devices available for communication networks. Nowadays, however, advances in film forming technology and processing technology make device fabrication at a practical level possible.

Regarding particularly the film forming technology for forming SiN and SiON films, the film forming technology for reducing the NH groups in the core, which has been an obstacle to a reduction in loss, has been established, which has contributed to, even with SiN and SiON as a core and a silicon oxide film as a clad, implementation of low-loss and high-performance optical waveguides applicable to communication networks.

CITATION LIST

Patent Literature

Patent Literature 1: Japanese Translation of PCT International Application Publication No. 2003-525195

SUMMARY

Technical Problem

However, for recent optical devices for communication networks, which are required to have high functionality, save energy, and be economical at the same time, it is essential to integrate optical devices with different functions on the same substrate. In achieving excellent characteristics in such an integrated device, a problem was found which is different from that in the fabrication of a single device.

For example, in the case of an optical waveguide device, a high-quality and lossless thermal silicon oxide film or a thermal CVD film can be used as a clad in a single device; thus, the development of a technique for forming films as a core and a technique for processing these films have been important for a reduction in loss in optical waveguides.

However, in the fabrication of integrated optical devices in which various devices are stacked on the same substrate, a film to be a clad (cladding film) is formed by low-temperature film formation to deal with the problem of heat resistance, while loss in cladding films has become non-negligible with an increasing demand for device performance and the problem has arisen that the quality of the cladding film also needs an improvement. As described above, for optical waveguides used in optical integrated devices, development of a structure and fabrication method different from those for optical waveguides in single devices has been required.

An object of an embodiment of the present invention, which has been made to solve the aforementioned problems, is to implement an optical integrated device including an optical waveguide exhibiting good optical characteristics with a small propagation loss.

Means for Solving the Problem

An optical integrated device according to embodiments of the present invention includes an optical waveguide formed on a substrate. The optical waveguide includes: a first cladding layer; a core formed on the first cladding layer; and a second cladding layer formed on the first cladding layer so as to cover the core. At least one of the first cladding layer and the second cladding layer is composed of a cladding material of silicon oxide containing deuterium atoms. The number of hydrogen atoms contained in the cladding material is smaller than the number of the deuterium atoms contained in the cladding material.

In the optical integrated device, the core is preferably composed of a core material of any one of silicon, silicon oxide containing an excess of silicon with respect to its stoichiometric composition, silicon oxynitride, and silicon nitride.

In the optical integrated device, the core material preferably contains deuterium atoms, and the number of hydrogen atoms contained in the core material is preferably smaller than the number of the deuterium atoms contained in the core material.

The optical integrated device includes an optical element formed on the substrate.

In a method embodiment of the present invention of manufacturing an optical integrated device including an optical waveguide formed on a substrate, the optical waveguide is manufactured by: a first step of forming a first cladding layer on the substrate; a second step of forming a core on the first cladding layer; and a third step of forming a second cladding layer on the first cladding layer so that the second cladding layer covers the core, and at least one of the first cladding layer and the second cladding layer is composed of a cladding material of silicon oxide prepared by a plasma CVD method using deuterated silane and oxygen as source gases.

In the method of manufacturing an optical integrated device, in the second step, the core may be formed using a core material of any one of silicon made by a plasma CVD method using oxygen gas or nitrogen gas, and deuterated silane gas as source gases, silicon oxide containing an excess of silicon with respect to its stoichiometric composition, silicon oxynitride, and silicon nitride.

The method of manufacturing an optical integrated device includes a fourth step of forming an optical element on the substrate.

In the method of manufacturing an optical integrated device, the plasma CVD method may be an ECR plasma CVD method.

Effects of Embodiments of the Invention

With the aforementioned aspects, embodiments of the present invention provide the excellent effect of implementing an optical integrated device including an optical waveguide exhibiting good optical characteristics with a small propagation loss.

DETAILED DESCRIPTION OF ILLUSTRATIVE EMBODIMENTS

Figure 1:
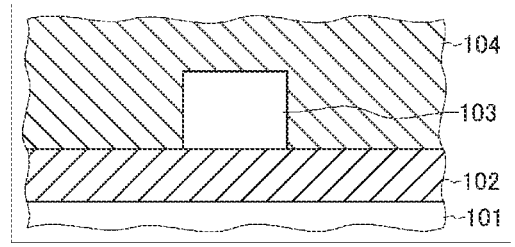
FIG. 1 is a cross-sectional view showing a partial configuration of an optical integrated device according to an embodiment of the present invention.

An optical integrated device according to an embodiment of the present invention will now be described with reference to FIG. 1. Note that FIG. 1 shows a cross section of a surface perpendicular to the direction in which light is guided. This optical integrated device includes an optical waveguide consisting of a first cladding layer 102 formed on a substrate 101, a core 103 formed on the first cladding layer 102, and a second cladding layer 104 covering the core 103 and formed on the first cladding layer 102. An optical element is provided on the substrate 101 together with the optical waveguide.

Here, in the optical integrated device according to the embodiment, first, at least one of the first cladding layer 102 and the second cladding layer 104 is composed of a cladding material of silicon oxide containing deuterium atoms. In addition, the number of hydrogen atoms contained in this cladding material is smaller than the number of deuterium atoms contained in the cladding material.

Note that the core 103 may be composed of a core material of any of the following: silicon, silicon oxide, which contains an excess of silicon with respect to its stoichiometric composition, silicon oxynitride, and silicon nitride. This core material also includes deuterium atoms, and the number of hydrogen atoms contained in the core material is preferably smaller than the number of deuterium atoms contained in the core material.

The first cladding layer 102 and the second cladding layer 104 have a thickness of, for example, about 1 to 3 µm. The core 103 has, for example, a rectangular cross section with a width of about 1 µm and a height of about 0.5 µm.

Figure 2:
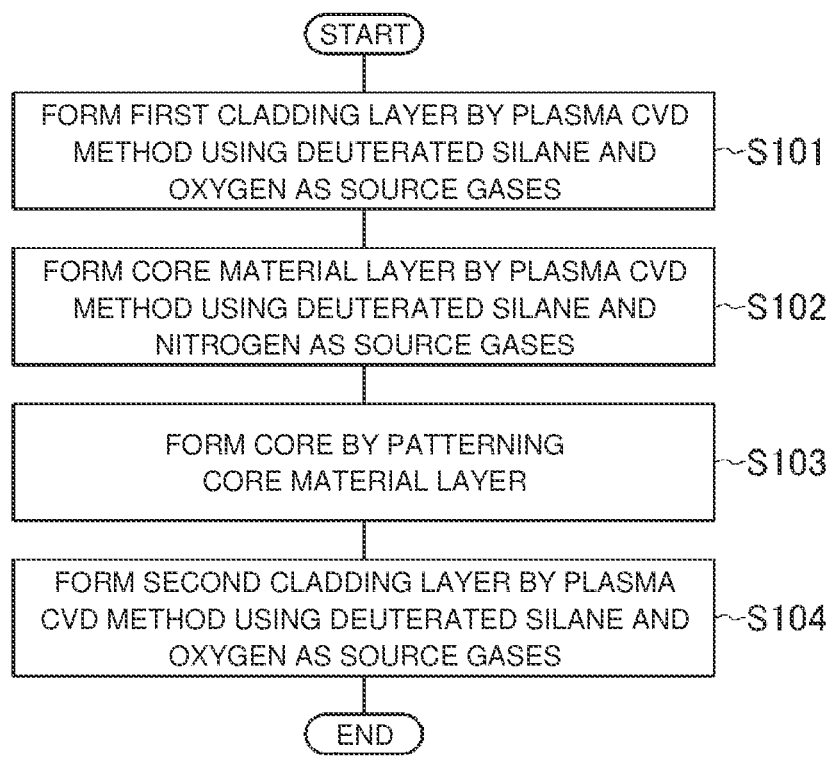
FIG. 2 is a flow chart for explaining a method of manufacturing an optical integrated device according to the embodiment of the present invention.

A method of manufacturing the optical integrated device according to the embodiment of the present invention will now be described with reference to the flow chart of FIG. 2.

First, in Step S101, a first cladding layer is formed on substrate (first step). Next, in Step S102, a core material is deposited by a predetermined deposition method to form a core material film on the first cladding layer. Next, in Step S103, the core material film is patterned to form a core on the first cladding layer (second step). Next, in Step S104, a second cladding layer is formed on the first cladding layer so as to cover the core (third step).

Through this process, the optical waveguide of the optical integrated device is fabricated. Further, an optical element is formed on the substrate (fourth step), thereby providing the optical integrated device including the optical waveguide and the optical element.

Here, at least one of the first cladding layer and the second cladding layer is composed of a cladding material of silicon oxide prepared by the plasma chemical vapor deposition (CVD) method using deuterated silane and oxygen as source gases. Consequently, silicon oxide contains deuterium atoms. With such deposition by the CVD method, the source gases contain $H_2O$ and the like as impurities, and moisture adheres to the inside of the film forming chamber. Consequently, the deposited silicon oxide contains a small amount of hydrogen atoms. However, as described above, when silicon oxide is deposited using deuterated silane as a source gas, the formed silicon oxide film contains more deuterium atoms than hydrogen atoms.

For the plasma CVD method here, the electron cyclotron resonance (ECR) plasma CVD method may be used. It is preferable to form each cladding layer at a low temperature of about 300° C. or lower, and thus preferable to use ECR plasma CVD which can form a high-quality film at a low temperature.

For example, in Step S101, the first cladding layer may be formed by depositing silicon oxide on the substrate to a thickness of about 1 µm to 3 µm by the ECR plasma method using deuterated silane and oxygen as source gases. Similarly, in Step S104, the second cladding layer may be formed by depositing silicon oxide on the substrate to a thickness of about 1 µm to 3 µm by the ECR plasma method using deuterated silane and oxygen as source gases.

In core formation (second step), silicon nitride prepared by the plasma CVD method using nitrogen gas and deuterated silane gas as source gases is used as a core material, and this core material is deposited to form a core material film which is then patterned. The core may have a rectangular cross section with a width of about 1 µm and a height of about 0.5 µm.

Note that the core material may be silicon oxide, which is prepared by the plasma CVD method using oxygen gas and deuterated silane gas as source gases and which contains an excess of silicon with respect to its stoichiometric composition. Alternatively, the core material may be silicon oxynitride prepared by the plasma CVD method using oxygen gas, nitrogen gas, and deuterated silane gas as source gases and which contains an excess of silicon with respect to its stoichiometric composition.

As described above, with core material deposition by the CVD method, the source gases contain $H_2O$ and the like as impurities, and moisture adheres to the inside of the film forming chamber. Consequently, the deposited core material film contains a small amount of hydrogen atoms. However, when the core material is deposited using deuterated silane as a source gas, the formed core material film contains more deuterium atoms than hydrogen atoms. In this state, for example, with the core made of silicon nitride, few hydrogen atoms are contained and few NH groups thus exist in the core, which contributes to suppression of light loss in the core due to absorption by NH groups.

The effect of making the cladding layer contain more deuterium atoms than hydrogen atoms will be described below. For example, in the case of a silicon oxide ($SiO_2$) film formed by the general-purpose plasma CVD method using $SiH_4$ as a source gas, a large amount of hydrogen atoms (H) is contained in the deposited film. When light is transmitted through the cladding layer of $SiO_2$ in such a state, absorption corresponding to the overtone of OH group vibration having a peak near 1.39 µm in $SiO_2$ is observed. Since the bottom of this absorption extends up to around 1.55 µm, it affects the propagation loss of the optical waveguide.

In the optical waveguide, most of the propagating light propagates in the core and the light does not propagate in the cladding layer; however, part of the light leaking from the core propagates in the clad. For this reason, at a certain distance of propagation, light absorption in the cladding layer also becomes non-negligible as propagation loss of the optical waveguide. It is therefore also important to prevent OH absorption in the cladding layer.

In the case where a cladding layer with a $SiO_2$ film containing more deuterium than hydrogen atoms is formed by the plasma CVD method using deuterated silane ($SiD_4$) and oxygen ($O_2$) as source gases, OH absorption of light propagating in the optical waveguide can be reduced, and a low-loss optical waveguide device can be implemented.

Figure 3:
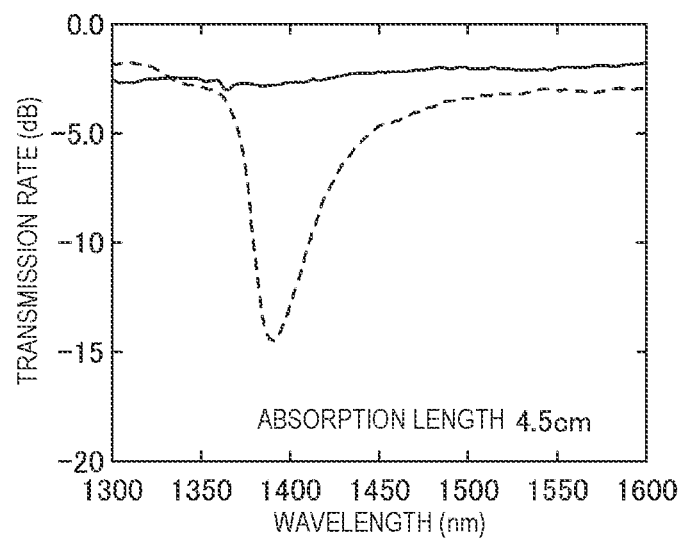
FIG. 3 is a characteristic plot showing light transmission spectra of a silicon oxide film (dashed line) containing hydrogen atoms and a silicon oxide film (solid line) not containing hydrogen atoms.

FIG. 3 shows the light transmission spectra of a silicon oxide film containing hydrogen atoms (H) (dashed line) and a silicon oxide film containing no hydrogen atoms (solid line). The drawing shows that light absorption loss can be dramatically reduced for the silicon oxide film containing no hydrogen.

Figure 4:
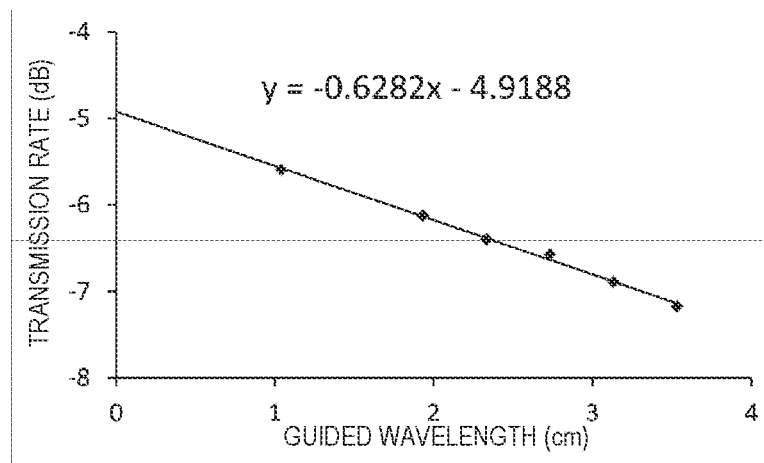
FIG. 4 is a characteristic plot showing the results of measurement of propagation loss in an optical waveguide in the embodiment with a silicon oxide core.

Next, FIG. 4 shows the result of measurement of the propagation loss of the optical waveguide in the embodiment in which the core is composed of silicon nitride. As shown in FIG. 4, a low-loss optical waveguide having a low loss value of 0.6 dB/cm was implemented. In this example, both the first cladding layer and the second cladding layer are composed of a cladding material of silicon oxide containing deuterium atoms, and the number of hydrogen atoms contained in the cladding material is less than the number of deuterium atoms contained in the cladding material; however, this is not necessarily the case. If one of the first cladding layer and the second cladding layer is in the aforementioned state, the effect of loss reduction can be obtained.

Figure 5:
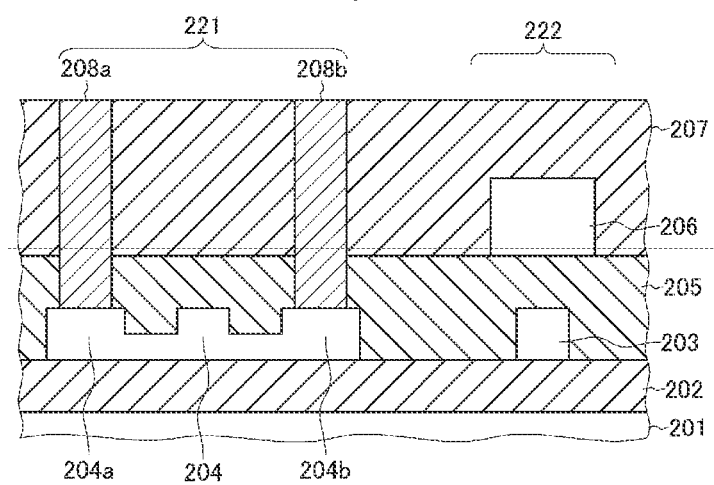
FIG. 5 is a cross-sectional view showing the detailed configuration of an optical integrated device according to the embodiment of the present invention.

Next, an example of an optical integrated device to which the optical waveguide according to the above-described embodiment is applied will be described with reference to FIG. 5. Note that FIG. 5 shows a cross section of a surface perpendicular to the direction in which light is guided.

In this optical integrated device, an optical modulator 221, which is an optical active device, and an optical waveguide 222 are integrated on a substrate 201 made of silicon. First, a first cladding layer 202 of silicon oxide and having a thickness of 3 µm is formed on the substrate 201.

A first core 203 made of silicon and a rib-type modulator core 204 made of silicon are formed on the first cladding layer 202, and slab layers 204a and 204b made of Si are connected to the modulator core 204. Further, a second cladding layer 205 made of silicon oxide and having a thickness of 0.3 µm is formed on the first cladding layer 202 so as to cover the first core 203, the modulator core 204, and the like.

The first cladding layer 202, the first core 203, and the second cladding layer 205 constitute a channel type optical waveguide. The slab layer 204a is an n-type layer made by introducing an n-type impurity thereinto, and the slab layer 204b is a p-type layer by introducing a p-type impurity thereinto. An optical modulator 221 consists of the modulator core 204, the n-type slab layer 204a, and the p-type slab layer 204b.

A second core 206 composed of $SiO_xN_y$ is formed on the second cladding layer 205 so as to coincide with the position of the first core 203. The second core 206 has a rectangular cross section with a width of about 4 µm and a height of about 2 µm.

A third cladding layer 207 composed of silicon oxide and having a thickness of about m is formed on the second cladding layer 205 so as to cover the second core 206. The second cladding layer 205, the second core 206, and the third cladding layer 207 constitute an optical waveguide. The first core 203 and the second core 206 overlap with each other via a second cladding layer 205 having an optimum thickness for optical coupling in a partial region.

In addition, through electrodes 208a and 208b are formed which pass through the third cladding layer 207 and the second cladding layer 205 and are electrically connected to the slab layers 204a and 204b.

The second cladding layer 205 and the third cladding layer 207 contain deuterium atoms (D), and are composed of silicon oxide in which the number of hydrogen atoms (H) contained therein is smaller than that of deuterium atoms. As a result, the second cladding layer 205 and the third cladding layer 207 contain a small amount of OH groups. In addition, the second core 206 contains deuterium atoms, and is composed of $SiO_xN_y$ in which the number of hydrogen atoms (H) is smaller than that of deuterium atoms. Consequently, the second core 206 contains a small amount of OH groups and NH groups.

An embodiment for manufacturing of the aforementioned optical integrated device will now be described briefly.

First, a well-known Silicon on Insulator (SOI) substrate is prepared. Of the SOI substrate, the substrate portion is the substrate 201 and the buried oxide layer is the first cladding layer 202. The surface silicon layer of the SOI substrate is patterned to form the first core 203, the modulator core 204, and the slab layers 204a and 204b.

For example, silicon oxide is deposited on the surface silicon layer by a known deposition method to form a silicon oxide layer. Next, the formed silicon oxide layer is patterned by a known lithography technique and etching technique to form a mask pattern to be a hard mask. The surface silicon layer is etched using this mask pattern as a mask, thereby forming a part of the first core 203, the modulator core 204, and recessed portions of the slab layers 204a and 204b.

Next, an n-type impurity is introduced into the slab layer 204a, and a p-type impurity is introduced into the slab layer 204b by a well-known ion implantation method to provide the n-type slab layer 204a and the p-type slab layer 204b.

Next, a resist pattern is formed that masks the modulator core 204, the formation regions of the slab layers 204a and 204b, and the first core 203. The surface silicon layer is patterned using this resist pattern as a mask, thereby finishing shaping the first core 203 and separating the regions of the modulator core 204 and the slab layers 204a and 204b. After that, the resist pattern is removed.

Next, the second cladding layer 205 is formed by depositing silicon oxide by the ECR plasma CVD method using $SiD_4$ and $O_2$ as source gases. The surface of the formed second cladding layer 205 is planarized by, for example, the chemical mechanical polishing (CMP) method.

Next, a silicon oxynitride layer is formed on the planarized second cladding layer 205 by depositing silicon oxynitride by the ECR plasma CVD method using $SiD_4$, $O_2$, and $N_2$ as source gases. The formed silicon oxynitride layer is patterned by a known lithography technique and etching technique to form the second core 206.

Next, the third cladding layer 207 is formed by depositing silicon oxide by the ECR plasma CVD method using $SiD_4$ and $O_2$ as source gases. Next, a contact hole is formed in the third cladding layer 207 by patterning with a known lithography technique and etching technique, and this contact hole is filled with an electrode material to form the through electrodes 208a and 208b.

According to the manufacturing method described above, the second cladding layer 205 and the third cladding layer 207 are formed by using the ECR plasma CVD method and can therefore be formed at a low temperature and do not damage the optical modulator 221. In the second cladding layer 205 and the third cladding layer 207, the respective optical waveguides including the first core 203 and the second core 206 composed of silicon oxide containing few hydrogen atoms but deuterium atoms can be made in a low-loss state barely affected by OH group absorption.

Further, in this optical integrated device, it is important for achieving high-efficiency coupling to control the film quality and thickness of the second cladding layer 205 the function of which is exerted when the waveguide mode of the optical waveguide consisting of the channel-type first core 203 optically couples with the optical waveguide of the second core 206 through the second cladding layer 205.

As described above, in the aforementioned optical integrated device, the second cladding layer 205 and the third cladding layer 207 were formed by the plasma CVD method using $SiD_4$ and $O_2$ gases as source gases and the second core 206 composed of $SiO_xN_y$ was formed by the plasma CVD method using $SiD_4$, $O_2$, and $N_2$ gases as source gases. Hence, the optical waveguides in the cladding layer and the core are formed in the presence of few OH groups in them, so that OH groups and NH groups, which affect light propagation in the communication wavelength band, are barely absorbed, thereby reducing the propagation loss of the optical waveguides.

Moreover, with the manufacturing method described above, the second cladding layer 205 and the third cladding layer 207 can be formed at a low temperature of about 200° C. or less; therefore, even with the optical modulator 221 formed at the time of their formation, the optical modulator 221 is not damaged and a low-loss optical waveguide can be implemented using the second core 206.

As described above, to form at least one of the first cladding layer and the second cladding layer, a cladding material of silicon oxide containing more deuterium atoms than hydrogen atoms was used. Hence, an optical waveguide can be implemented that exhibits a low propagation loss and excellent optical characteristics even when integrated with other optical devices, so that an optical integrated device can be implemented that includes an optical waveguide exhibiting a low propagation loss and excellent optical characteristics.

It should be noted that the present invention is not limited to the embodiments described above, and many modifications and combinations can be made by those skilled in the art without departing from the technical idea of the present invention.

REFERENCE SIGNS LIST

101 Substrate
102 First cladding layer
103 Core
104 Second cladding layer

The invention claimed is:

1. An optical integrated device comprising:
a substrate; and
an optical waveguide formed on the substrate, wherein the optical waveguide comprises:
a first cladding layer;
a core formed on the first cladding layer; and
a second cladding layer formed on the first cladding layer so as to cover the core, wherein at least one of the first cladding layer and the second cladding layer comprises a cladding material of silicon oxide containing deuterium atoms and hydrogen atoms, and wherein a total number of the hydrogen atoms contained in the cladding material is smaller than a total number of the deuterium atoms contained in the cladding material.

2. The optical integrated device according to claim 1, wherein the core comprises a core material of silicon, silicon oxide containing an excess of silicon with respect to its stoichiometric composition, silicon oxynitride, or silicon nitride.

3. The optical integrated device according to claim 2, wherein the core material contains deuterium atoms and hydrogen atoms, and wherein a total number of the hydrogen atoms contained in the core material is smaller than a total number of the deuterium atoms contained in the core material.

4. The optical integrated device according to claim 3, further comprising an optical element formed on the substrate.

5. The optical integrated device according to claim 1, further comprising an optical element formed on the substrate.

6. A method of manufacturing an optical integrated device, the method comprising:
forming an optical waveguide on a substrate, wherein forming the optical waveguide comprises:
a first step of forming a first cladding layer on the substrate;
a second step of forming a core on the first cladding layer; and a third step of forming a second cladding layer on the first cladding layer so that the second cladding layer covers the core, wherein at least one of the first cladding layer and the second cladding layer comprises a cladding material of silicon oxide prepared by a plasma CVD method using deuterated silane and oxygen as source gases, and wherein the source gases include $H_2O$ as an impurity.

7. The method according to claim 6, wherein in the second step, the core is formed using a core material of silicon, silicon oxide containing an excess of silicon with respect to its stoichiometric composition, silicon oxynitride, or silicon nitride.

8. The method according to claim 7, wherein the core material is silicon made by a second plasma CVD method using a first source gas of oxygen gas or nitrogen gas and a second source gas of deuterated silane gas.

9. The method of according to claim 7, further comprising a fourth step of forming an optical element on the substrate.

10. The method according to claim 9, wherein the plasma CVD method is an ECR plasma CVD method.

11. The method of according to claim 6, further comprising a fourth step of forming an optical element on the substrate.

12. The method according to claim 6, wherein the plasma CVD method is an ECR plasma CVD method.

13. The optical integrated device according to claim 1, further comprising an optical modulator formed on the substrate, wherein the optical modulator comprises:

a rib-type modulator core;
an n-type slab layer connected to the rib-type modulator core; and
a p-type slab layer connected to the rib-type modulator core.

14. The optical integrated device according to claim 13, further comprising a second optical waveguide formed over the optical waveguide, wherein the second optical waveguide comprises:

the second cladding layer;
a second core formed on the second cladding layer and overlapping the core via the second cladding layer, wherein the second core comprises a core material of $SiO_xN_y$, the core material contains deuterium atoms and hydrogen atoms, and a total number of the hydrogen atoms contained in the core material is smaller than a total number of the deuterium atoms contained in the core material; and
a third cladding layer formed on the second cladding layer so as to cover the second core, wherein the second cladding layer and the third cladding layer each comprise the cladding material.

15. The optical integrated device according to claim 14, further comprising first and second through electrodes passing through the third cladding layer and the second cladding layer and electrically connected to the n-type slab layer and the p-type slab layer, respectively.

* * * * *